[11] 4,386,424
[45] May 31, 1983

[54] BROAD BAND TELECOMMUNICATION SYSTEM

[75] Inventor: Hans-Martin Christiansen, Munich, Fed. Rep. of Germany

[73] Assignee: Siemens Aktiengesellschaft, Berlin & Munich, Fed. Rep. of Germany

[21] Appl. No.: 203,981

[22] Filed: Nov. 4, 1980

[30] Foreign Application Priority Data

Dec. 20, 1979 [DE] Fed. Rep. of Germany ....... 2951495

[51] Int. Cl.³ ............................ H04B 9/00; H04J 1/00
[52] U.S. Cl. ........................................... 370/4; 358/142
[58] Field of Search ........................ 370/1, 2, 3, 4, 11, 370/50; 358/142

[56] References Cited

U.S. PATENT DOCUMENTS

| | | |
|---|---|---|
| 3,205,310 | 9/1965 | Schlichte . |
| 3,303,286 | 2/1967 | Schlichte . |
| 3,931,512 | 1/1976 | Kent et al. . |
| 4,061,577 | 12/1977 | Bell ................................. 370/3 |
| 4,075,429 | 2/1978 | Bell ........................... 179/15 BM |

FOREIGN PATENT DOCUMENTS

| | | |
|---|---|---|
| 1023801 | 7/1958 | Fed. Rep. of Germany . |
| 1227079 | 12/1963 | Fed. Rep. of Germany . |
| 2426363 | 1/1975 | Fed. Rep. of Germany . |
| 2538638 | 3/1977 | Fed. Rep. of Germany . |
| 2634357 | 2/1978 | Fed. Rep. of Germany . |
| 2900813 | 7/1979 | Fed. Rep. of Germany . |
| 2856217 | 7/1980 | Fed. Rep. of Germany . |
| 1164337 | 9/1969 | United Kingdom . |

OTHER PUBLICATIONS

Bauch, "Künftige Kommunikationstechnik mit Lichtleitern" ntz, vol. 32 (1979), No. 3, pp. 150–153.
"Antennen-Information" No. 63 (Jun. 1979), pp. 1–5, Siemens.
Nachrichtenubertragung, Grundlagen und Technik, Dr.-Ing. E. Holzer Springer-Verlag-1966, pp. 52–53.
Richtfunktechnik-Heinz Pooch-Fachverlag Schiele & Schon GmbH-Berlin, pp. 5, 13, 14, 27, 28, 1974.
NTZ-Nachrichtentechnische Zeitschrift Band 31 1978-VDE Verlag GmbH-Berlin.
Fernsehtechnik ohne Ballast-Otto Limann-Franzis Verlag Muenchen-pp. 49–50, 1976.
Lehrbuch Der Hochfrequenztechnik Fritz Vilbig. Akademische Verlagsgesellschaft M.B.H. Frankfurt Am Main 1958—p. 505.

*Primary Examiner*—Thomas A. Robinson
*Attorney, Agent, or Firm*—Hill, Van Santen, Steadman, Chiara & Simpson

[57] ABSTRACT

In an exemplary embodiment, subscriber lines are formed by means of light waveguides and transmit pulse-modulated TV signals in time-division multiplex. These pulse-modulated signals are converted into PAM signals at the subscriber side, from whose frequency spectrum formed by a sequence of frequency bands, respectively one frequency band arrives via a subscriber-allocated distributor line operated in frequency-division multiplex to a video receiver now being operated at the subscriber location.

6 Claims, 1 Drawing Figure

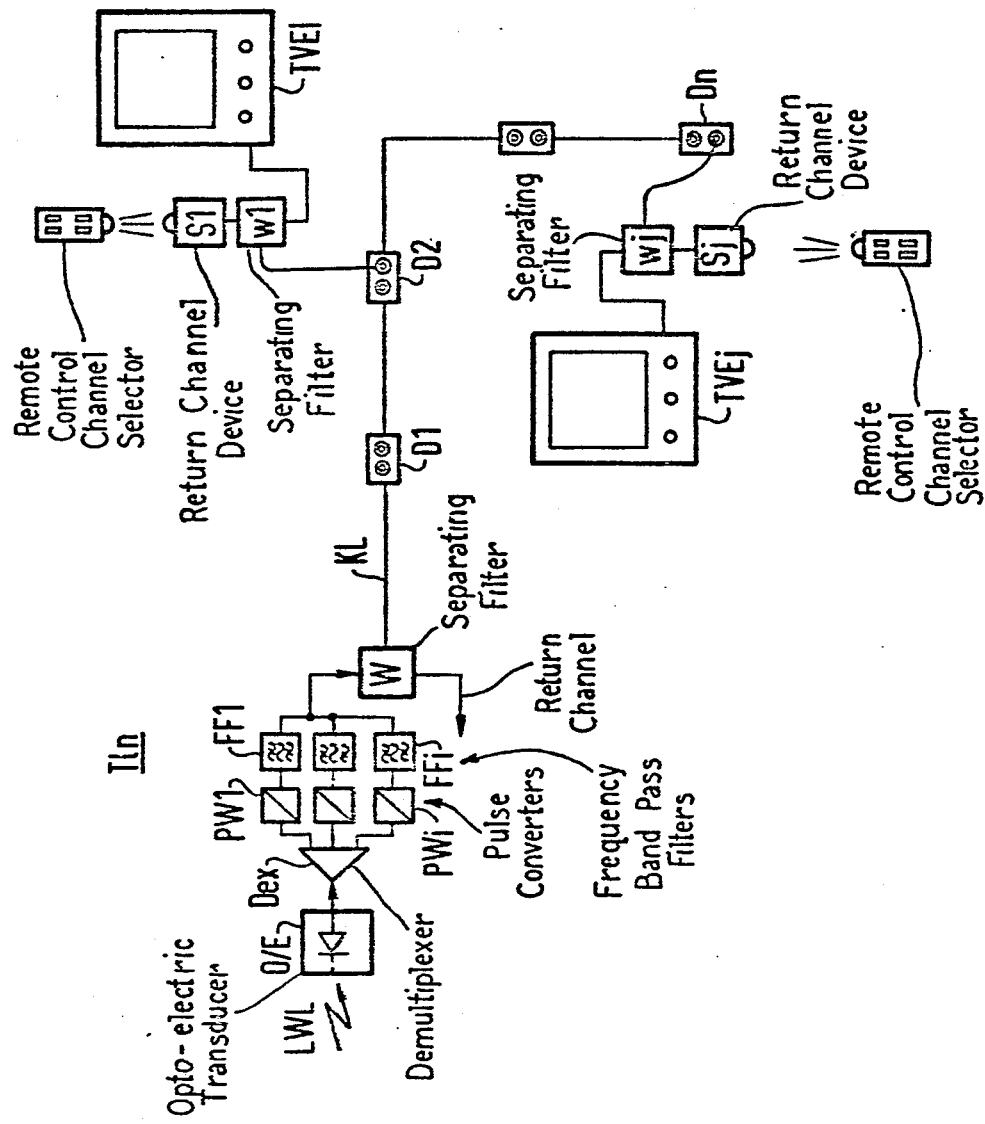

BROAD BAND TELECOMMUNICATION SYSTEM

BACKGROUND OF THE INVENTION

Recent developments in telecommunications have resulted in broad band communication networks with subscriber lines formed by means of light waveguides. A star network of light waveguides with one light waveguide per dwelling unit has proven, expedient at the subscriber level. The light waveguide connects a central distribution or switching location (preferably spatially united with the nearest telephone switching location) to the dwelling unit of the subscriber and via which, under certain conditions, all telecommunication services for the corresponding dwelling unit can be sequenced. This permits, at least approximately, the following broad band communication possibilities for a dwelling unit:

three video channels for three video receivers with independent access to all TV signal sources which can be reached by the distribution system or switching location, or with independent access to all TV programs available there, under certain conditions, three return channels for program selection; and, under certain conditions, sequencing for interactive services as well as 20 VHF stereo radio channels (NTZ, Vol. 32 (1979), No. 3, pages 150–153; Antenna Information No. 63, June 1979, pages 3–5.

For transmitting a plurality of video signals or, respectively, of data signals from a preferably central transmission location via a light waveguide connection to a reception location, it is known (from the German OS No. 2,538,638 or, respectively, German OS No. 2,426,363) to convert the video signals or, respectively, data signals into pulse-modulated signals and to transmit these in time-division multiplex via the light waveguide connection.

If, given a broad band communication system of approximately the type outlined above, one is confronted after a time-division multiplex transmission of video signals with the task on the reception side of distributing the plurality of TV signals transmitted in the time-division multiplex to a corresponding plurality of receivers provided at the subscriber, then one could conceive of first regaining the original video signals and then supplying them to the individual receivers in respective video frequency position via receiver-individual lines or, converted into different frequency channels with the assistance of amplitude modulators, via a common distributor line. However, both ways require a relatively high outlay, whether it be of special distribution lines, or whether it be of special amplitude modulators. The invention reveals a way to avoid this.

SUMMARY OF THE INVENTION

The invention relates to a broad band telecommunication system with a light waveguide lying respectively between a preferably central transmission location and a subscriber terminal at the reception side, a plurality of TV signals pulse-modulated on the transmission side according to the time variation of video signals being transmitted via said light waveguide in time-division multiplex; this broad band telecommunication system is inventively characterized in that the pulse modulated TV signals transmitted in time channels determinable by video receivers operated at the subscriber terminal are converted on the reception side into PAM signals and these are supplied to frequency band pass filters which are respectively transmissive for a frequency band from the sequence of frequency bands forming the frequency spectrum of PAM signals, the output signals of said frequency band pass filters arriving at a subscriber-individual distribution line to which the video receivers now being operated at the subscriber terminal are connected.

The invention offers the advantage of being able to avoid a reconversion of the transmitted TV signals into the original video signal form and their distribution via receiver-individual distribution lines as well as being able to avoid an amplitude modulation of carrier oscillations to be offered receiver-individual, said amplitude modulation being effected by means of the regained video signals, and thus keeping the outlay on the subscriber side low by avoiding special modulators and demodulators as well as by avoiding an expensive laying of lines.

Let it be pointed out here that it is known (from the German LP No. 1,023,801), given a communication transmission system in the manner of a carrier frequency system, to provide the transmission side of the system with an arrangement which samples (preferably equidistantly) the individual messages in a chronological sequence, the sampling frequency of said arrangement being at least twice as great for each message as the band width of the respective message and which supplies at least one side band from the frequency spectra of each message formed in the sampling to the transmission path, and that it is further known to provide means at the reception side for regaining the original messages from the transmitted side bands, whereby the means at the reception side can consist of a filter system which branches the individual side bands into separate transmission channels in which the individual messages are regained, preferably by means of frequency conversion; further, for shifting an electrical a.c. signal into a different frequency position, it is known (from the German LP No. 1,135,972), upon employment of a switch actuated with a frequency which is at least twice as high as the difference of the highest and the lowest signal frequency, a band pass filter being preconnected and a band pass filter being post-connected to said switch, whereby the pass band of the band pass filters respectively corresponds to one of the side bands which occur during the switching operation, upon employment of said switch, to employ a circuit known per se in which the switch connects to shunt capacitances via a series capacitance, whereby these components and the switching duration are fixed in such manner that a charge exchange occurs between the capacitances in the form of a semi-oscillation. However, no closer points of contact are given with a broad band telecommunications system with a light waveguide respectively lying between a central transmission location and a subscriber terminal on the reception side which transmits a plurality of TV signals pulse-modulated according to the measure of video signals in time-division multiplex and with the distribution of the TV signals to a plurality of video receivers provided at one and the same subscriber terminal.

In a further development of the invention, the pulse-modulated TV signals can be converted into PAM signals in a pulse converter common to all time channels, which involves correspondingly little outlay; alternately thereto, however, the pulse-modulated TV signals can also be converted into PAM signals in pulse converters individually allocated to the time channels, whereby a higher cross-talk attenuation is achieved.

In the broad band telecommunications system according to the invention, the outlay at the receiver side can be kept particularly small when, in a further development of the invention, the PAM signals are respectively transmitted to the respective frequency band pass filters in the manner of a pulse-wise energy transmission; this makes it possible to convert nearly the entire energy of the PAM signal into the frequency band allocated to the respective video receiver, whereby a corresponding improvement of the signal-to-noise ratio ensues which makes a further amplification seem unnecessary given line lengths to the video receiver which are not all too great.

Further features of the invention derive from the following explanations of the invention on the basis of the accompanying drawing sheet; and other objects, features and advantages will be apparent from this detailed disclosure and from the appended claims.

BRIEF DESCRIPTION OF THE DRAWING

The single FIGURE of drawing shows a circuit diagram of an embodiment of the present invention.

DETAILED DESCRIPTION

In a scope required for an understanding of the invention, the drawing schematically illustrates an exemplary embodiment of a broad band telecommunications system according to the invention. This broad band telecommunications system exhibits a light waveguide LWL (only indicated in the drawing in terms of its function) which may lead from a central transmission location (not illustrated in greater detail in the drawing) to a subscriber terminal Tln, said central transmission location being realizable with a broad band switching system of the type described with further details which may be of interest, in the German application P No. 29 44 784.5 filed Nov. 6, 1979, and in the corresponding U.S. application, U.S. Ser. No. 203,980 filed Nov. 4, 1980; this subscriber terminal Tln may, for example, form a dwelling terminal with a plurality of video receivers TVEl, ... TVEj, to/from which a plurality of communication possibilities may respectively be given in the manner initially explained. The light waveguide LWL, which may be connected at its transmission side to an electro-optical transducer given, for example, by means of a light-emitting diode (LED) or by means of a laser diode, is terminated at the reception side by means of an opto-electronic transducer O/E realizable with a photodiode. Let a plurality of TV signals which are pulse-modulated on the transmission side according to the time variation of video signals, preferably pulse-phase-modulated or pulse-code-modulated, be transmitted in time-division multiplex via the light waveguide LWL. Proposals for the time-division multiplex transmission can be found elsewhere, for example, in the German patent application No. 28 56 217.6-31 filed Dec. 27, 1978 (now Offenlegungsschrift No. 28 56 217 dated July 3, 1980), for which reason this shall not be discussed in greater detail here, particularly since this is also not required for an understanding of the invention.

The opto-electrical transducer O/E now first leads to a demultiplexer Dex which can be formed by means of a plurality of time channel switches which are cylically closed at the clock rate of the received time-division multiplex signals, said plurality of time channel switches corresponding to the plurality of time channels provided in the time-division multiplex system. A respective pulse converter circuit PW is connected to the outputs of the demultiplexer Dex allocated to the individual time channels. In these pulse converter circuits, which can respectively be formed in accord with the type of pulse-modulation given on the light waveguide, for example, by means of a standard PPM/PAM converter or by means of a standard PCM decoder, the pulse modulated TV signals which are transmitted in the individual time channels via the light waveguide LWL to the subscriber terminal Tln are converted individually by time channels into PAM signals. Frequency band pass filters FF are post-connected to the pulse converter circuits PW, said frequency band pass filters FF, interconnected at the output side, leading via a separating filter W to a distributor line KL preferably a coaxial line, provided for the subscriber or, respectively, dwelling unit individually, whereby this coaxial line, under certain conditions, can also be formed by means of a coaxial line of an antenna system already existing in the appertaining dwelling unit. Sockets Dl, ... Dn are connected to the coaxial line KL and video receivers TVEl, ... TVEj can be connected to said sockets in any random distribution; thereby, it is indicated in the drawing that the sockets Dl ... Dn can also exhibit additional receptacles for a connection of radio receivers (not of further interest here). In the broad band telecommunications system sketched in the drawing, a video receiver TVEl is connected to the video receptacle of the socket D2; a video receiver TVEj is connected in an analogous manner to the socket Dn.

The video signals, more precisely stated, the TV signals pulse-modulated according to the measure of these video signals, intended for the video receivers TVEl, TVEj are combined in the central transmission location in time-division multiplex (according to the parameters of the destination information respectively stored in the central transmission location), so that the pulse-modulated TV signals are transmitted via the light waveguide LWL to the demultiplexer Dex in time channels which may be determined, i.e., fixed or at least identified proceeding from the video receivers TVEl, TVEj now being operated at the coaxial line KL. Thereby, the TV signals intended for a video receiver operated at any given socket of the coaxial line, for example, for the video receiver TVEl operated at the socket D2, arrive at the pulse converter circuit driven in the appertaining time channel by the demultiplexer Dex, for example, arrive at the pulse converter circuit PWl which converts the received PPM or PCM signals into PAM signals in the individual time channel and supplies these to the following frequency band pass filter FFl. The frequency band pass filter FFl is transmissive for a specific frequency band of the frequency spectrum of the PAM signal offered by the preceding pulse converter circuit PWl, said frequency spectrum consisting of a periodic sequence (periodic with the clock frequency of the PAM signals) of such frequency bands—respectively having the width of the video signal frequency band—whereby the said frequency band—as well as the remaining frequency bands—contains the entire signal information transmitted in the appertaining time channel and contained in the PAM signal; the signal information transmitted in this frequency band then arrives on the path via the separating filter W, the coaxial line KL and, in the example, via the socket D2 and the separating filter wl to that video receiver, in the example, the video receiver TVEl, whose tuning circuit is set to just this frequency band.

In an analogous manner, for example, TV signals intended for the video receiver TVEj now operated under the conditions illustrated in the drawing at the socket Dn arrive in another time channel to be determined proceeding from the video receiver TVEj to the pulse converter circuit, for example, the pulse converter circuit PWi to which the frequency band pass filter FFi is connected, driven in this time channel by the demultiplexer Dex and converting the received PPM or PCM signals into PAM signals in the individual time channel. The frequency band pass filter FFi is transmissive for a different frequency band of the PAM signal frequency spectrum, so that the information transmitted in this other frequency band arrives on the path via separating filter W, coaxial line KL and, in the example, via the socket Dn and the separating filter wj to that video receiver, in the example the video receiver TVEj, whose tuner is set to the appertaining frequency band.

Let it be pointed out here that, deviating from the conditions illustrated in the drawing, a common pulse converter circuit can also be provided instead of pulse converter circuits (PWl ... PWi) individually allocated to the time channels, said common pulse converter circuit then being preconnected to the demultiplexer Dex.

As already mentioned, the frequency spectra of the PAM signals consist of periodic sequences of frequency bands (periodic with the clock frequency of the PAM signals) respectively with the width of the video signal frequency band. Expediently, the clock frequency is selected with, for example, approximately 12 MHz in such manner that multiples of the clock frequency of the PAM signals lie at least approximately at band limits of a plurality of officially allocated television channels. Thus, for example under European standards, multiples of a PAM signal clock frequency of 12 MHz lie approximately in television channel one at 48 MHz, at 60 MHz in the area of the television channel four, at 180 MHz in the area of the television channel six, at 216 MHz in the area of the television channel eleven. This makes it possible to supply the video signals intended for the individual video receivers to said individual video receivers at least respectively approximated to a normal television signal position, for example, in the European frequency bands 47 ... 54 MHz, 59 ... 66 MHz, 179 . .. 186 MHz and 215 ... 222 MHz, whereby, at any rate, as in the cited example of the television channels four, six and eleven, the television receiver reproducing the respective video program would have to be somewhat detuned (or: adjusted in terms of its tuning) in order to thereby compensate a frequency offset of approximately 1 through 2 MHz which still exists; this, however, usually being unproblematical.

Without this being illustrated in detail in the drawing, the PAM signals proceed from the respective pulse converter circuit PW to the next-successive frequency band pass filter FF, expediently in the manner of a pulse-wise energy transfer given which the entire energy of the PAM signal is converted at least approximately into the desired frequency band. Circuits for such a pulse-wise energy transfer are known as so-called recharge, supplementary charge/discharge circuits (for example, from the German LP No. 1,227,079 or from the German LP No. 1,282,728) or as so-called resonant transfer circuits, for which reason this need not be discussed in greater detail here.

The determination of the time channel and thus, the determination of the frequency channel as well, due to rigid allocation between time and frequency channels, in which the video signals to be received by a video receiver are to be transmitted can be undertaken, given a prescribed occupation of the channels with different video programs, by means of setting the tuning circuit (tuner) of the video receiver to a frequency channel carrying a desired program, if necessary, after it has been determined which channel carries a desired program by means of viewing or, respectively, listening to the individual programs. However, it is also possible that a determination concerning which video signals are now to be received by a subscriber can be undertaken proceeding from the video receiver via a return channel with the assistance of return channel devices Sl, Sj belonging to the video receivers TVEl, TVEj. To that end, it is indicated in the drawing that corresponding infrared or ultrasonic signals can be wirelessly supplied to the return channel devices Sl, Sj, for example, by means of a remote control device, said infrared or ultrasonic signals then—without this being illustrated in greater detail in the drawing—being converted in the return channel devices into digital signal words of, for example, eight bits in order to be then transmitted in the individual return channels allocated to the video receivers TVE (or, respectively, to their return channel devices) operated at the coaxial line KL, said return channels likewise being on the coaxial line KL, and being then further transmitted via the separating filter W to the switching location where, finally, they become effective as destination information as previously mentioned.

It will be apparent that many modifications and variations may be effected without departing from the scope of the novel concepts and teachings of the present invention.

I claim as my invention:

1. A broadband telecommunication system, comprising:
    a light waveguide lying between a central transmission location and a receiving location subscriber terminal, and carrying a plurality of time-division multiplexed signals in individual time channels pulse-modulated at the transmission location corresponding to a plurality of video signals;
    means for converting the pulse-modulated video signals in the individual time channels into PAM signals connected to frequency band pass filter means transmissive for a frequency band from a sequence of frequency bands forming a frequency spectrum of the PAM signal;
    output signals of said frequency band pass filter means being connected to a distribution line connecting to video receiver means at the subscriber terminal;
    the video signals being transmitted in time channels corresponding to said video receiver means operated at the subscriber terminal; and
    said means for converting providing said PAM signals such that multiples of a clock frequency of the PAM signals lie at least approximately at band limits of a plurality of television channels on which said video receiver means is operable, said PAM signals being supplied to said frequency band pass filter means whose output signals proceed to said subscriber distribution line and video receiver means operated at the subscriber terminal.

2. A broadband telecommunications system according to claim 1 wherein the pulse-modulated video signals are converted into PAM signals in time-channel associated pulse converters.

3. A broadband telecommunications system according to claim 1 wherein the pulse-modulated video signals are converted into PAM signals in a pulse converter means shared by all time channels.

4. A broadband telecommunications system according to claim 3 wherein the pulse converting means provides pulse-wise energy transmission from the pulse converter means to the frequency band pass filter means.

5. The system according to claim 4 wherein a plurality of pulse converters are connected to respective frequency band pass filters.

6. The system according to claim 1 wherein said video receiver means comprises a plurality of video receivers along the distribution line.

* * * * *